June 5, 1951 F. W. SLACK 2,556,006
AUTOMOBILE BUMPER GUARD FOR VEHICLE JACKS
Filed Feb. 14, 1946 3 Sheets-Sheet 1

INVENTOR.
Frederic W. Slack.
BY
Harness and Harris
ATTORNEYS.

June 5, 1951  F. W. SLACK  2,556,006
AUTOMOBILE BUMPER GUARD FOR VEHICLE JACKS
Filed Feb. 14, 1946  3 Sheets-Sheet 2
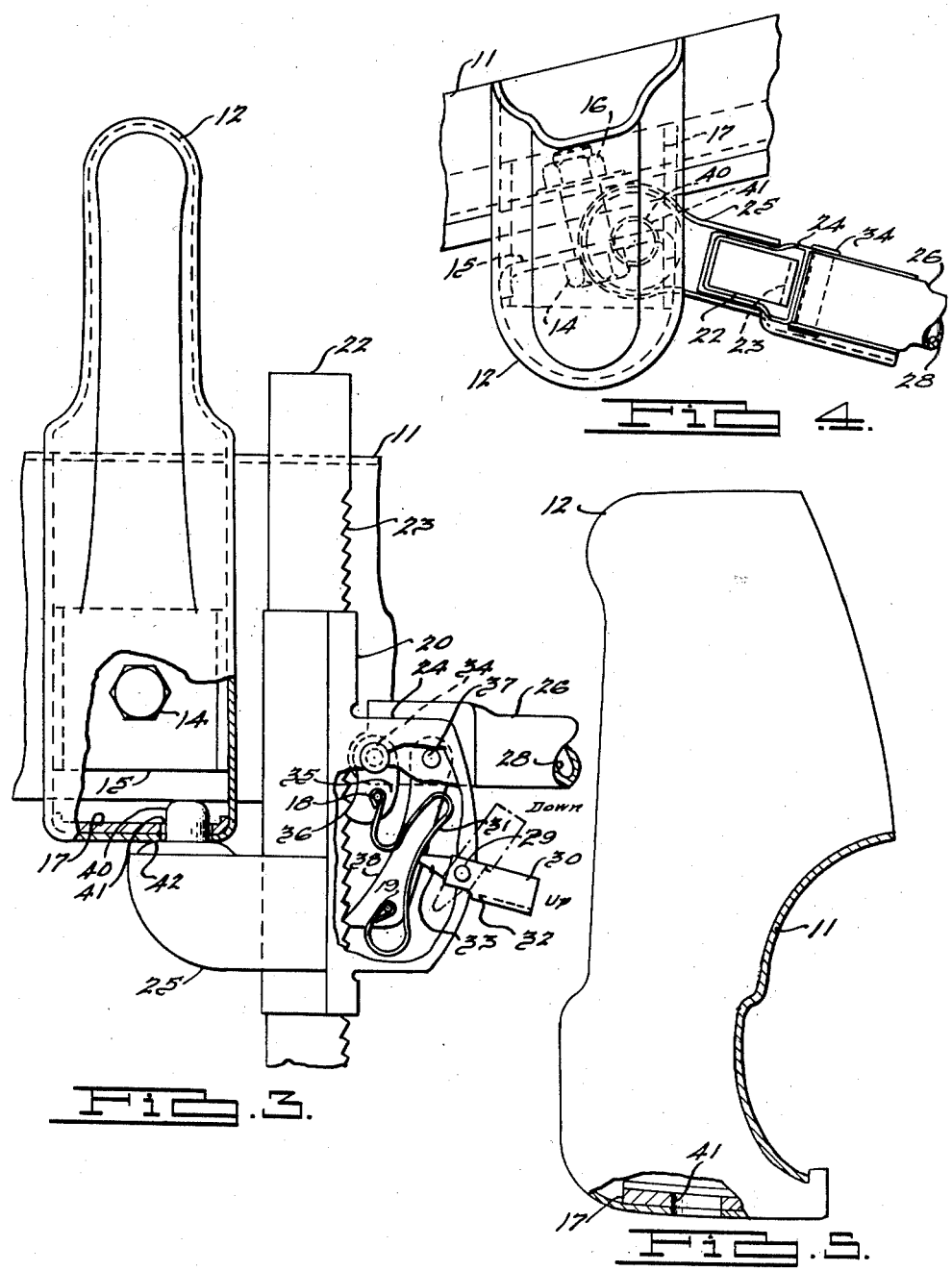
INVENTOR.
Frederic W. Slack.
BY
Harness and Harris
ATTORNEYS.

June 5, 1951   F. W. SLACK   2,556,006
AUTOMOBILE BUMPER GUARD FOR VEHICLE JACKS
Filed Feb. 14, 1946   3 Sheets-Sheet 3
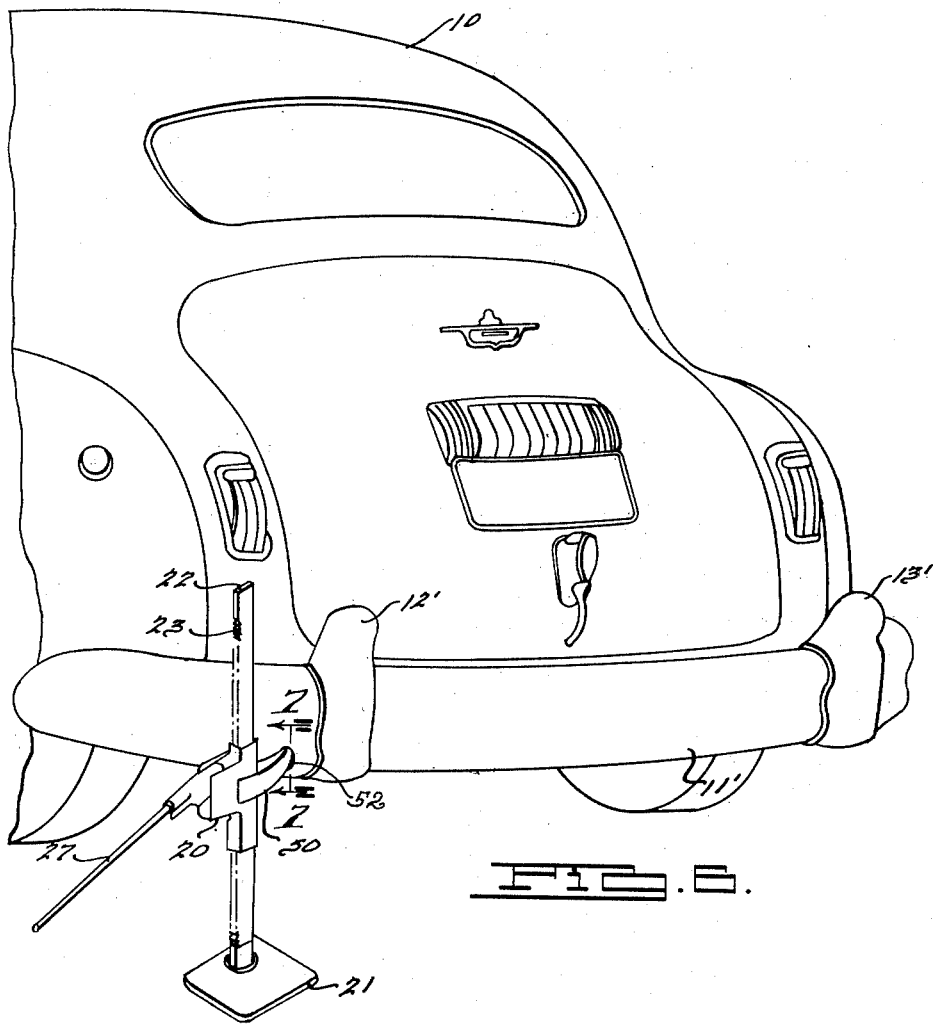
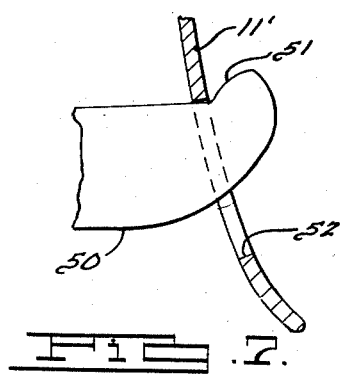
INVENTOR.
Frederic W. Slack.
BY
Harness and Harris
ATTORNEYS.

Patented June 5, 1951

2,556,006

UNITED STATES PATENT OFFICE 2,556,006

AUTOMOBILE BUMPER GUARD FOR VEHICLE JACKS

Frederic W. Slack, Detroit, Mich., assignor to Chrysler Corporation, Highland Park, Mich., a corporation of Delaware Application February 14, 1946, Serial No. 647,613

1 Claim. (Cl. 293—69)

This invention relates to means for jacking an automobile and more particularly the combination of a jack with a cooperating element provided in the bumper bar or bumper guard construction.

The trend of automobile design to lower the center of gravity and extend the body and fenders to overhang the chassis has rendered impractical the old type of automobile jack which was designed to be placed under the chassis. The current use on automobiles of stone shields which cover the aperture between the bumper bar and automobile body has made unfeasible the use of jacks designed to engage the bumper supports.

It is an object of my invention to provide a jack adapted to engage a cooperating element provided in the bumper bar or the bumper guard. With my invention there will be required no expensive attachments that require manipulation or could be lost. The novel construction of the bumper member and jack themselves will include the mating support devices.

It is a further object of my invention to eliminate the manufacture of additional parts to be assembled with the bumper members or jack.

The jacking of an automobile by lifting the sprung part of its structure (usually one corner thereof) introduces lateral forces on the jack. There is a tendency for the supported surface to slip relative to the lifting surface of the jack. Frequently, the vehicle slips completely off the jack and damages itself or injures the person attempting to operate the jack.

A further object of my invention is to prevent the vehicle from slipping by the cooperation of the unique bumper member construction with the jack.

In the drawings:

Fig. 3 is a vertical view of a cooperating bumper guard and jack with portions thereof broken away.

Fig. 4 is a horizontal view of Fig. 3.

Fig. 5 is a vertical side view of a bumper guard with a portion thereof broken away to show the cooperating element.

Fig. 6 is a perspective view showing the application of a jack to the bumper bar in a modified form of my invention.

Fig. 7 is a vertical section on the line 7—7 of Fig. 6.

Figure 1:
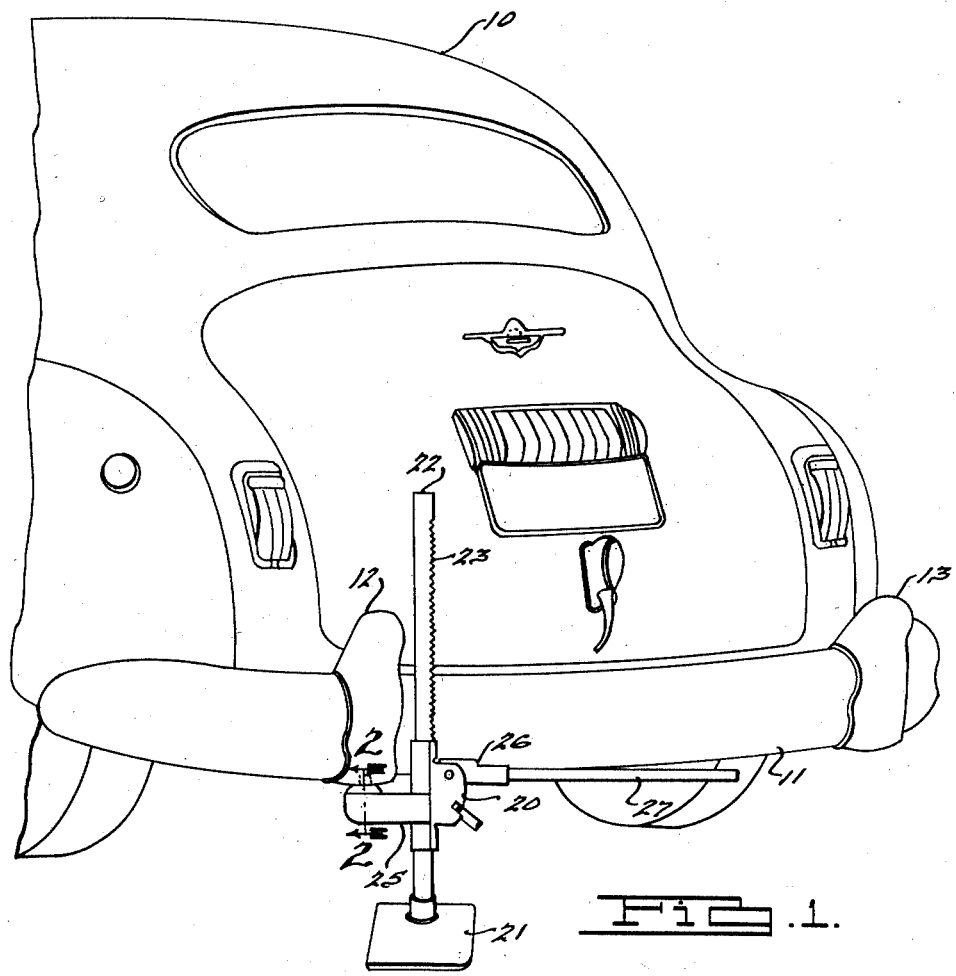
Fig. 1 is a perspective view showing the application of the jack to the bumper guard of an automobile.
Figure 2:
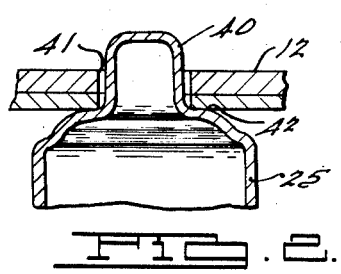
Fig. 2 is a vertical section on the line 2—2 of Fig. 1.

Referring now in detail to the drawings in Fig. 1, I have shown an automobile 10 having a bumper bar 11 and bumper guards 12 and 13. The automobile bumper as described herein consists of a horizontal bumper bar and vertical bumper guards. A bumper member may be either a bumper bar or a bumper guard. The construction of these bumper guards is similar, but for simplicity, only bumper guard 12 will be referred to herein. In addition, similar bumper guards will be provided as components of the front bumper of the automobile, although only the rear bumper has been illustrated.

The bumper bars and guards define the terminal transverse boundary of the vehicle at each end thereof and by providing means therein to cooperate with a vehicle jack free access to the most exposed portion of the vehicle is available.

In Figs. 3 and 4 bumper guard 12 is shown fixed to bumper bar 11 by the engagement with bolt 14 of lateral member 15 welded or otherwise secured to the bumper guard. Bolt 14 is fastened to bumper bar 11 as by nut 16. As illustrated in Figures 3, 4 and 5 the bumper guard comprises a hollow shell and a strengthening member 17 which is provided in abutting relationship with the base of the guard 12.

With the exception of the means provided for the engagement of the jack with the bumper member, the jack's construction and lifting mechanism may be varied. The jack illustrated will be described herein.

Jack 20 comprises a base plate 21 supporting a vertical rod 22 provided with a serrated face at 23, housing 24 containing the jack mechanism and encompassing rod 22, laterally extending arm 25, adapted to engage and lift the vehicle, actuating lever 26 and handle 27.

The jack mechanism is substantially enclosed in housing 24 and includes pin 34 rotatably connecting operating lever 26 to housing 24. Pawl 35 is suspended from pin 34. Pin 37 rotatably connects operating lever 26 and pawl 38, but is not connected to housing 24. Pawls 35 and 38 are provided with pins 18 and 19 respectively to which spring 31 is fastened.

Selector 30 is pivotally mounted at 29 on the housing 24 and adapted to selectively engage or disengage spring 31 when rotated. When selector 30 is in the position illustrated in solid lines in Fig. 3 the projection 33 of selector 30 contacts spring 31 and bows it to the left as illustrated. Under these conditions the mechanism will lift housing 24 relative to rod 22 when actuating lever 26 is reciprocated in a vertical plane. When selector 30 is rotated counter-clockwise to the position shown in dotted lines in Fig. 3 the spring 31 is released. Under these conditions, reciprocation of actuating lever 26 will lower housing 24 relative to rod 22.

When selector 30 is rotated clockwise until abutment 32 engages housing 24 to limit further movement projection 33 of selector 30 engages spring 31 and when actuating lever 26 is lifted vertically, it will pivot about pin 34 which engages housing 24 and actuating lever 26. Pawl 35 rotatably suspended from pin 34 is in engagement with one serration 36 on rod 22. Pawl 38 rotatably suspended from pin 37 which is fastened to actuating lever 26 will be lifted vertically with actuating lever 26. Spring 31 urges pawl 38 to the left and into engagement with a serration on face 23 of rod 22. Pawl 36 carries the weight of the vehicle during the above operation. Actuating lever 26 may now be lowered. Pawl 38, in contact with a serration on face 23 will support the weight and actuating member 26 will rotate about pin 37 lifting pin 34, pawl 35 and housing 24. Spring 31 will urge pawl 35 to the left and into engagement with a serration on rod 22 above serration 36. The actuating lever 26 may then be fulcrumed upward about pin 34 and the pawl 35 will support the weight as pawl 38 moves into engagement with a serration higher than that previously engaged by it. The reciprocation of actuating lever 26 may be repeated until the housing 24 and vehicle have been lifted to the desired height.

Actuating lever 26 is provided with a tubular portion 28 adapted to receive the handle 27. Handle 27 is used as a lever to permit the operator to apply a minimum of vertical force. The mechanical advantage is dependent upon the distance from the pin being used as a fulcrum to the end of handle 27 as compared to the distance between pins 34 and 37.

When selector 30 is rotated out of engagement with spring 31 reciprocation of handle 27 will lower the jack housing 24 and vehicle. When selector 30 is disengaged from spring 31, counterclockwise rotation of actuating lever 26 about pin 34 will leave pawl 35 in load carrying engagement with a serration on face 23 of rod 22. This counter-clockwise rotation of actuating lever 26 about pin 34 will lift pawl 38 out of engagement with face 23 of rod 22. Downward rotation of actuating lever 26 about pin 34 with the cooperation of spring 31 holding pawl 35 substantially stationary relative to actuating lever 26 will direct pawl 38 into engagement with a lower serration on face 23 of rod 22, due to the horizontal component of motion in the rotation of pin 37 about pin 34. Further downward movement of actuating lever 26 will transfer the load from pawl 35 to pawl 38 and permit spring 31 to retract pawl 35 from the serrated face 23 of rod 22. Upward motion of actuating lever 26 will rotate this lever about pin 37 thereby lowering pin 34, pawl 35 and housing 24. This motion brings pin 18 downward toward pin 19 and induces stress in spring 31 which reacts against pin 18 and pawl 35 to urge the pawl into engagement with a serration on the face 23 of rod 22. This serration is lower than the serration originally engaged by pawl 35 because of the downward motion of pin 34 when actuating lever 26 rotates about pin 37. Further upward movement of actuating lever 26 transfers the fulcrum from pin 37 to pin 34 and lifts pawl 38 out of engagement with face 23 of rod 22. Handle 27 and actuating lever 26 may be reciprocated as often as necessary repeating the above motions until the housing and vehicle are lowered as far as desired.

In order that the lifting and lowering of housing 24 described above may be transmitted to the vehicle I have provided vertical extension or pin 40 carried by horizontally extending arm 25 of jack housing 24. Vertical pin 40 preferably has a circular horizontal cross section. The shell of the bumper guard 12 and strengthening member 17 are provided with aligned openings which together form an opening at 41 adapted to receive pin 40. Arm 25 is provided with horizontal surface 42 which is adapted to transmit vertical force to bumper guard 12. Pin 40 prevents bumper guard 12 and vehicle 10 from sliding off the jack. Pin 40 is carried by arm 25. Opening 41 is located to one side of a vertical plane passing through the longitudinal axis of the vehicle so that one wheel may be lifted while the remaining wheels remain in contact with the ground.

In Figs. 6 and 7 I have illustrated a modified form of my invention. Bumper bar 11' is provided with an opening at 52 adapted to receive an arm 50 of jack 20. Opening 52 is laterally offset from the longitudinal axis of the vehicle so that one corner thereof may be lifted. Arm 50 is provided with a vertical extension or head 51 adapted to prevent the bumper bar 11' from slipping off the jack due to motion of the vehicle in the direction of the said arm. Arm 50 is adapted to engage the sides of opening 52 to prevent lateral motion of said bar relative to said jack. Although only one opening 52 has been illustrated it is intended that the automobile be provided with at least four openings. An opening is to be provided near each end of both front and rear bumper bars. The operation of the mechanism of the jack illustrated in Fig. 6 is similar to that described for the jack in Figs. 1 and 3.

I claim:

A bumper guard for a motor vehicle adapted to be carried by and extend transversely of a horizontal vehicle bumper bar, said bumper guard comprising a hollow shell provided with a substantially horizontal base portion and a strengthening plate carried within said hollow shell and abutting said base portion to strengthen the latter against deformation, said shell base portion and said plate being provided with aligned openings having a vertical axis and adapted to receive a movable portion of a vehicle jacking device.

FREDERIC W. SLACK.

REFERENCES CITED

The following references are of record in the file of this patent:

UNITED STATES PATENTS

| Number | Name | Date |
|---|---|---|
| 995,583 | Willour | June 20, 1911 |
| 1,325,739 | Lyon | Dec. 23, 1919 |
| 1,572,603 | Heide | Feb. 9, 1926 |
| 1,702,027 | Beaver | Feb. 12, 1929 |
| 1,747,170 | Howell | Feb. 18, 1930 |
| 2,023,079 | Jandus | Dec. 3, 1935 |
| 2,060,780 | Woodworth | Nov. 10, 1936 |
| 2,092,719 | Ryerson | Sept. 7, 1937 |
| 2,164,621 | Pfauser | July 4, 1939 |
| 2,224,434 | Jandus | Dec. 10, 1940 |

FOREIGN PATENTS

| Number | Country | Date |
|---|---|---|
| 382,016 | Great Britain | Oct. 20, 1932 |
| 474,804 | Great Britain | Nov. 4, 1937 |
| 476,625 | Great Britain | Dec. 8, 1937 |
| 850,439 | France | Sept. 11, 1939 |